(12) United States Patent
Jordan (10) Patent No.: US 6,349,474 B1
(45) Date of Patent: Feb. 26, 2002

(54) CABLE CUTTER

(75) Inventor: Bruce D. Jordan, La Plata, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/584,200

(22) Filed: May 31, 2000

(51) Int. Cl.⁷ .................................................. B26D 1/04
(52) U.S. Cl. ........................... 30/228; 30/90.1; 30/241; 30/DIG. 4
(58) Field of Search ........................... 30/228, 90.1, 92, 30/180, 277, 278, 241, DIG. 4

(56) References Cited

U.S. PATENT DOCUMENTS

| | | | |
|---|---|---|---|
| 3,643,329 A | * | 2/1972 | Lieberman .................... 30/180 |
| 3,739,673 A | * | 6/1973 | Temple .......................... 30/92 |
| 3,763,738 A | * | 10/1973 | Temple ......................... 30/228 |
| 4,026,028 A | * | 5/1977 | Green .......................... 30/241 |
| 4,136,445 A | | 1/1979 | Grubb |
| 4,180,351 A | * | 12/1979 | Orrill et al. .............. 30/DIG. 4 |
| 4,521,963 A | | 6/1985 | Lind et al. |
| 4,587,733 A | * | 5/1986 | Staempfli ..................... 30/278 |
| 5,172,479 A | | 12/1992 | Keeton |
| 5,224,268 A | | 7/1993 | Pemberton |
| 5,233,749 A | | 8/1993 | Saito et al. |
| 5,272,811 A | | 12/1993 | Armand |
| 5,341,572 A | | 8/1994 | Michelson |
| 5,416,975 A | | 5/1995 | Saito et al. |
| 5,598,635 A | | 2/1997 | Saito |
| 5,722,170 A | | 3/1998 | Smith |

\* cited by examiner

*Primary Examiner*—Hwei-Slu Payer
(74) *Attorney, Agent, or Firm*—Mark Homer (57) ABSTRACT

A cable cutter for cutting a cable by using an explosive event is provided. The cable cutter includes a main body and an initiator assembly connected to the main body. The main cutter includes a cutter jaw and a receptacle having an opening accommodating a cable, a longitudinal bore formed in the housing and connected to the receptacle and having an inner opening and an outer opening, a cutter blade having a cutting edge facing the inner opening and a base facing the outer opening, being inserted into the bore of the receptacle, and slidably moving toward the cutter jaw within the bore of the receptacle to cut a cable disposed within the receptacle and between the cutter jaw and the cutting edge of the cutter blade. The initiator assembly includes a coupler, a passageway formed within the coupler, a cap covering having a hole connected to the coupler, and an explosive material and detonator are inserted through the hole in the cap into the passageway. A cone shaped surface is extended from a circumferential inner surface of one end of the passageway to an opening of the coupler connected to the main body.

12 Claims, 14 Drawing Sheets

CABLE CUTTER

BACKGROUND OF THE INVENTION

1. Field of the invention

The present invention relates generally to a cable cutter for cutting a cable, and more particularly to a cable cutter driven by an explosive event.

2. Description of the Related Art

Various types of the cutters have been used for cutting a cable. Typically, a blade and a cutter jaw or two scissors controlled by an actuator in a powered cutting device pivot or reciprocally move to cut a cable disposed between the blade and the cutter jaw or the two scissors. The cutting device, however, becomes more complicated and more difficult to be assembled since the power cutting device needs to cut the cable more efficiently.

Efforts to effectively cut a cable have spawned various types of cable cutters. For example, U.S. Pat. No. 5,598,635 for a Hydraulic Puncher issued to Saito and U.S. Pat. No. 5,416,975 for a Hydraulic Puncher and U.S. Pat. No. 5,233,749 for a Hydraulic Actuator issued to Saito et al. disclose a hydraulic puncher including a puncher holder, a C-shaped frame integrally connected to the punch holder, a die holder removably connected to one end of the C-shaped frame. U.S. Pat. No. 5,341,572 for a Hydraulic Punching Tool issued to Michelson discloses a hydraulic punching tool alternatively producing a relatively strong power stroke and a relatively weak reset stroke. U.S. Patent No. 5,272,811 for a Hydraulically Controlled SelfNavy Contained Multi-functional Tool Such As Shears/Separator issued to Armand discloses a hydraulically controlled self-contained multi-functional hand tool including a hydraulic ram portion with a rod. I have noticed that the embodiments described by these references fail to show an inert assembly detachably attached to the main body of the cable cutter.

U.S. Pat. No. 5,224,268 for an Apparatus For a Shearing a Material Mass issued to Pemberton discloses an apparatus for shearing a material mass having a pair of movable shears, an outrigger secured to the one of the shears and extended across the path of the other one of the movable shears and supporting the material mass during severing and transferring torque from one shear to urge it toward the other shear. U.S. Pat. No. 5,172,479 for a Pneumatic Scissors issued to Keeton discloses a pneumatic scissors including a stationary substantially planar blade, and a movable blade having a thickness greater than that of the stationary planar blade, and a pneumatic actuator. U.S. Pat. No. 4,521,963 for a Hydraulic Cable And Rod Cutting And Crimping Device issued to Lind et al. discloses a hydraulic cable and rod cutting and crimping device including dual manually held handles centrally receiving and exhausting the operating pressurized hydraulic fluid and a safety trigger assembly, and a piston assembly. U.S. Pat. No. 4,136,445 for a Pneumatically Operated Cable-Slitting Tool issued to Grubb discloses a pneumatically operated cable-slitting tool having a toggle trigger for actuating a control rod controlling a pair of pneumatic check valves. Also, I have noticed that the embodiments described by these references do not show an inert assembly detachably attached to the main body of the cable cutter.

U.S. Pat. No. 5,722,170 for a Cartridge Actuated Cable Cutter issued to Smith discloses an explosive cartridge actuated cable cutter device shearing power transmission line or underground cable and including a bore accommodating a piston, a radially extending impact shoulder attached to a piston, a circumferential step formed on the bore and forming a reaction shoulder in the bore, a shock attenuator sleeve inserted into the circumferential step and between the bore and the piston. The piston rod compressively engages shock attenuator sleeve and compress the shock attenuator sleeve against reaction shoulder, thereby dissipating the kinetic energy of the piston member at the conclusion of the cutting stroke.

SUMMARY OF THE INVENTION

It is an object of the present invention to provide an improved cutting device for cutting a cable.

It is another object to provide a cutting device able to be easily assembled.

It is yet another object to provide a cutting device to be assembled and loaded at the time of use.

It is yet another object to provide a cutting device driven by an explosive event which powers a cutting blade to cut a cable.

These and other objects may be achieved by providing a cable cutter for cutting a cable by using an explosive event supplied by a detonator with a shock tube initiator. The cable cutter comprises a main body and an initiator assembly connected to the main body. A cutter disposed in the main body to slidably move within a bore formed on the main body. The initiator assembly is coupled to the main body and includes a coupler removeably attached to the main body, a passageway formed within the coupler, a cap, having a hole formed within the cap, removeably attached to the coupler, and at least one detonator inserted into the hole in the cap and through the passageway wherein the detonator is proximate to the base of the cutter. When the detonator is initiated, the explosive event resulting from the detonator pushes the cutter forward to cut the cable or other workpiece. The initiator assembly can be detachably attached to the main body of the cable cutter and loaded at the time of use. A 45 degree right-angle cone is provided within the coupler to direct the output energy toward the base of the cutter body causing a more efficient cutting operation of the cutter blade.

BRIEF DESCRIPTION OF THE DRAWINGS

A more complete appreciation of the invention, and many of the attendant advantages, thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
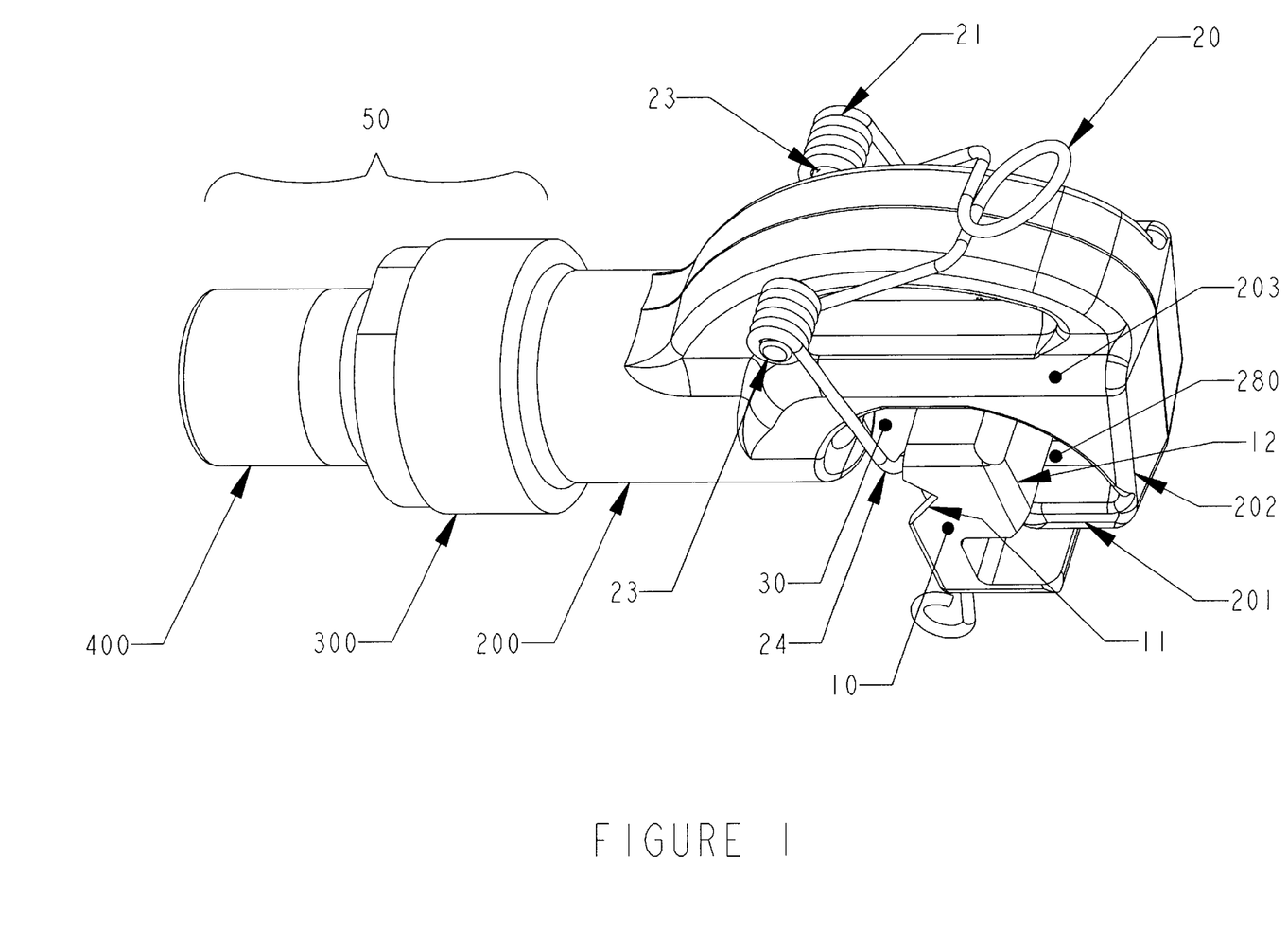
FIG. 1 is a perspective view showing a cable cutter according to the principle of the present invention.

Returning now to FIG. 1, a cable cutter includes a main body 200 and an initiator assembly 50 detachably attached to the main body 200. The initiator assembly includes a coupler 300 having one end coupled to one end of main body 200 and a cap 400 coupled to the other end of coupler 300. The main body 200 defines a supporter 203, a jaw 202 perpendicular to supporter 203, and a jaw extension 201 parallel to supporter 203. A block receptacle 280 is formed between supporter 203 and jaw extension 201, and a block body 12 of a block 10 is disposed within block receptacle 280. A block groove 11 is formed on block body 12 of block 10. A work piece is placed on the block groove 11 and disposed in a work piece receptacle 30 formed between main body 200 and block groove 11 of block 10. A plurality of pins 23 protrude from both sides of main body 200 and support a coil portion 21 of a spring 20. A block supporter 24 extended from spring 20 is disposed to push the block 10 against jaw 202. The spring 20 holds block 10 in place until the spring 20 is released, thereby allowing block 10 to be removed from the workpiece receptacle 30. If block 10 is not used in main body 200, the work piece can be disposed in block receptacle 280 to be cut.

Figure 2:
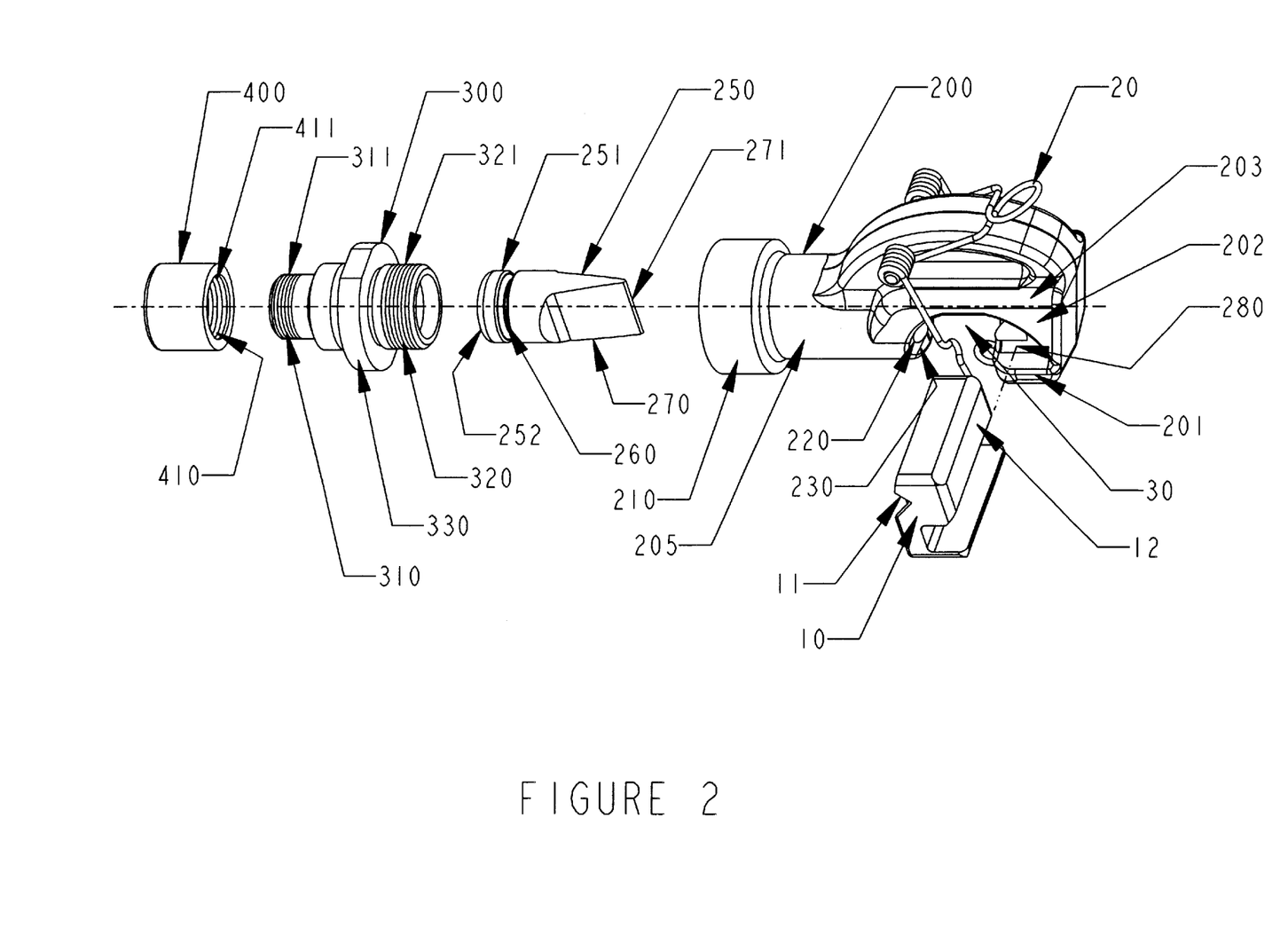
FIG. 2 is an exploded view of the cable cutter.

FIG. 2 is an exploded view of the cable cutter. A cutter container 205 is formed on the end of the main body 200 opposite the jaw 202. A connector 210 is formed on one end of the cutter container 205, and a cutter opening 220 is formed inside of cutter container 205. A circular end 230 of the cutter opening 220 faces the workpiece receptacle 30. A coupler 300 is coupled to connector 210 of main body 200 while cutter 250 is movably inserted into cutter opening 220 of main body 200. Cutter 250 includes a blade 270, a cutting edge 271 formed on one end of cutter 250, cutter body 251, an o-ring groove 260 formed on a circumferential surface of cutter body 251, and a cutter base 252 formed on the other end of cutter 250. A coupler body 330 of coupler 300 has a head coupler 320 formed on one end of coupler body 330 of coupler 300 and a cap coupler 310 formed on the other end of coupler body 330 of coupler 300. A thread 321 formed on outer surface of head coupler 320 is coupled to a thread formed on an inner surface of connector 210, and head coupler 320 is disposed adjacent to the cutter base 252 of cutter 250 when coupler 300 is securely coupled to main body 200. A thread 311 formed on an outer surface of cap coupler 310 is coupled to a thread 411 formed on an inner surface of coupler hole 410 of cap 400.

Figure 3:
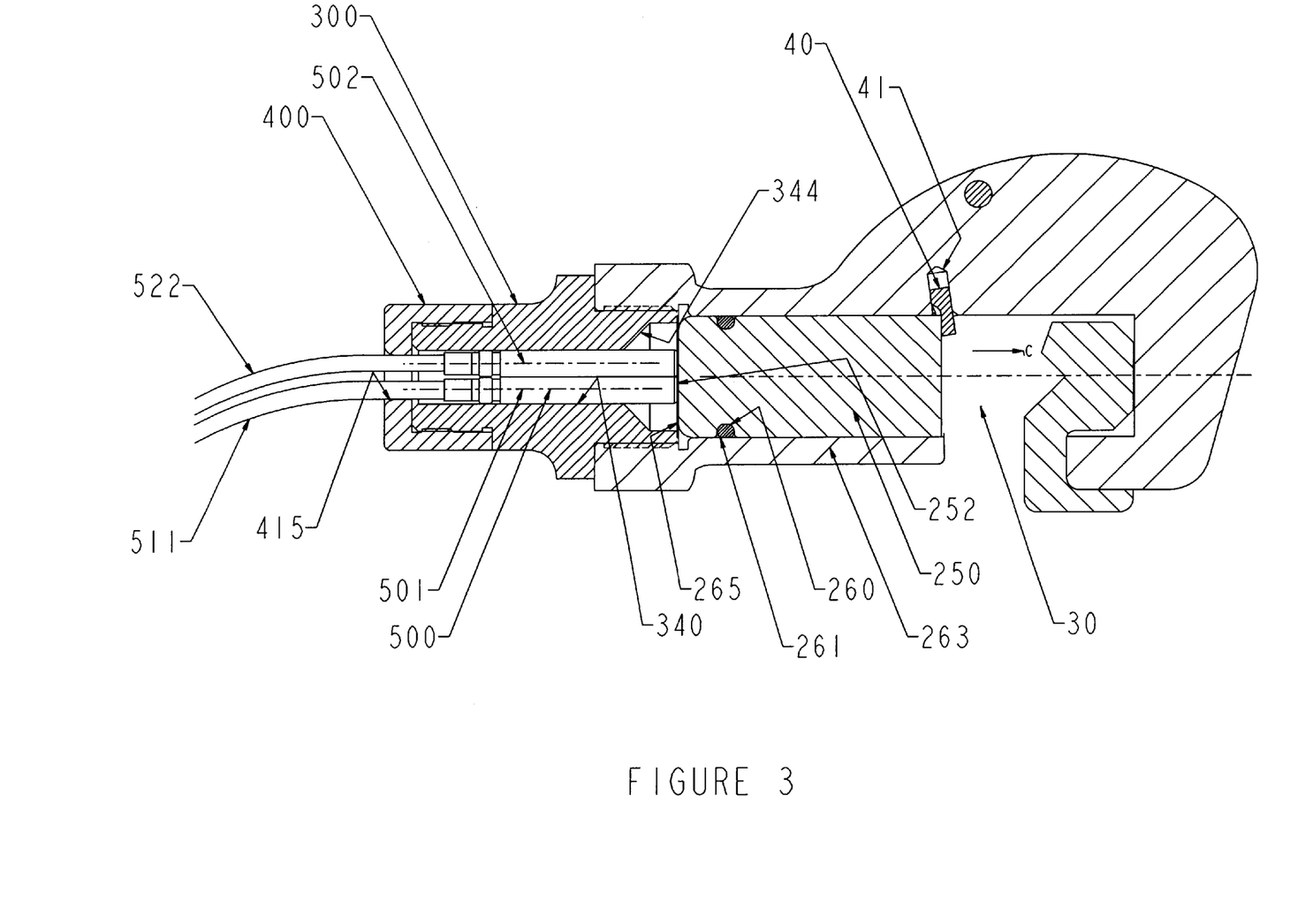
FIG. 3 is a cross-sectional view showing an embodiment of the cable cutter of FIG. 1.

FIG. 3 shows a cross-sectional view of cable cutter. A longitudinal bore 263 is formed inside of cutter container 205, and an o-ring 261 is inserted between an inner surface of longitudinal bore 263 and o-ring groove 260 of cutter 250 to seal cutter 250 within longitudinal bore 263. Cutter 250 is disposed within longitudinal bore 263 to move in a direction of an arrow C through cutter opening 220. When cutter 250 is in a first position as shown in FIG. 3, the workpiece is placed in workpiece receptacle 30. The cutter 250 is held in the first position by a stopper 40 inserted into a stopper hole 41 formed on an inner surface of longitudinal bore 263. The stopper 40 protrudes from the inner surface of longitudinal bore 263 and contacts the cutting edge 271 (not depicted) of cutter 250. In one embodiment of the invention, the stopper 40 comprises a pin. Stopper 40 is cut off when the cutter 250 initially moves in the direction of the arrow C, and then the cutter can continue to move in the direction of the arrow C.

Again referring to FIG. 3, a passageway 340 is formed inside of coupler 300, and a cone shaped-surface 344 extended from passageway 340 is formed inside of head coupler 320 of coupler 300. A detonator assembly 500, depicted in this embodiment of the invention having a plurality of detonators 501, 502, is fixedly inserted into passageway 340 and cone space 350 formed inside of cone shaped-surface 344, and a plurality of initiators 511, 522 extend through the hole 415 formed on the cap 400. Each end of detonators 501, 502 face the cutter base 252 of cutter 250 through a detonator guide 265 disposed between cone shaped-surface 344 and cutter base 252. When the initiators 511,522 are actuated a shock wave initiates the main explosive within the detonators 501, 502. In one embodiment of the invention, the detonator assembly 500 comprises a dual non-electric M7 detonator. In another embodiment, the detonator assembly 500 comprises an electrically actuated detonator. In a preferred embodiment of the invention, the main charge of the detonators 501, 502 comprises RDX (Cyclotrimethylenetrinitramine).

When the main charge of the detonators 501, 502 are initiated, the output from the resulting explosion is reflected by the cone space 350 to the detonation guide 265 to cutter base 252. The explosive event acts on cutter base 252 to move the cutter 250 in the direction of the arrow C.

Figure 4:
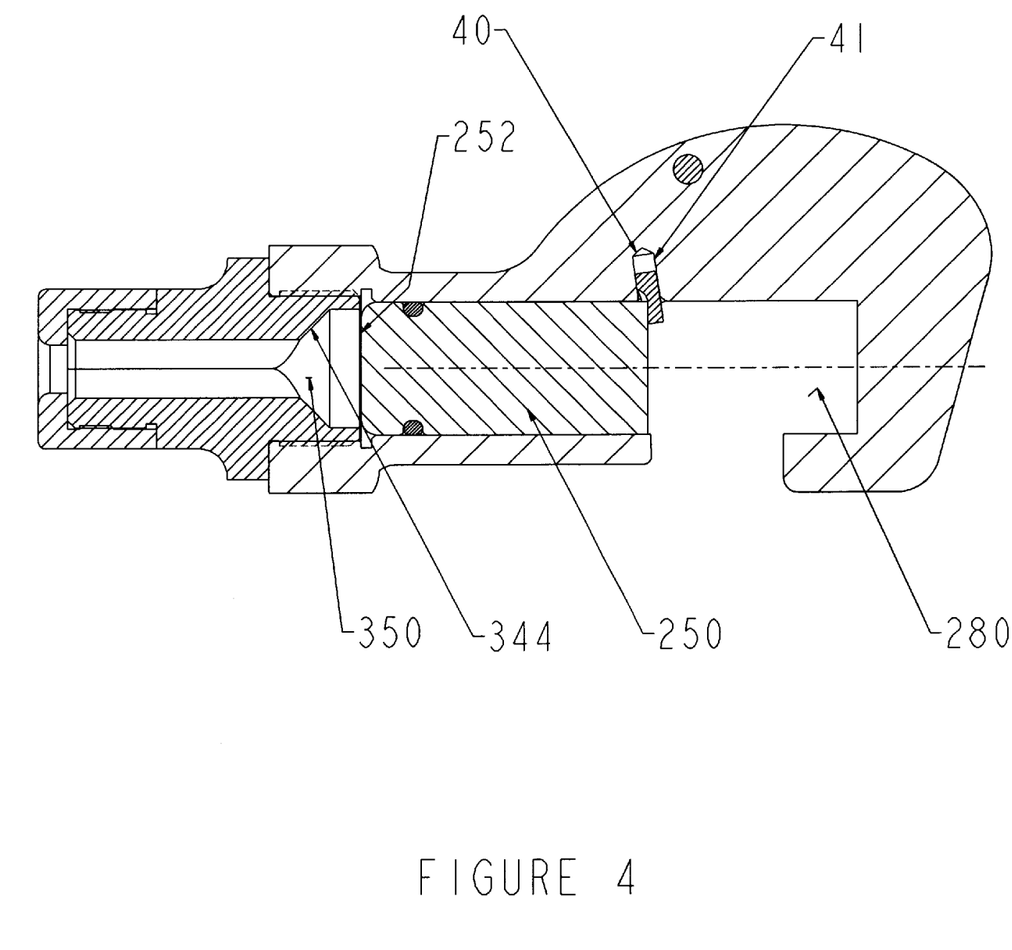
FIG. 4 is a cross-sectional view showing an embodiment of the cable cutter of FIG. 1.
Figure 5:
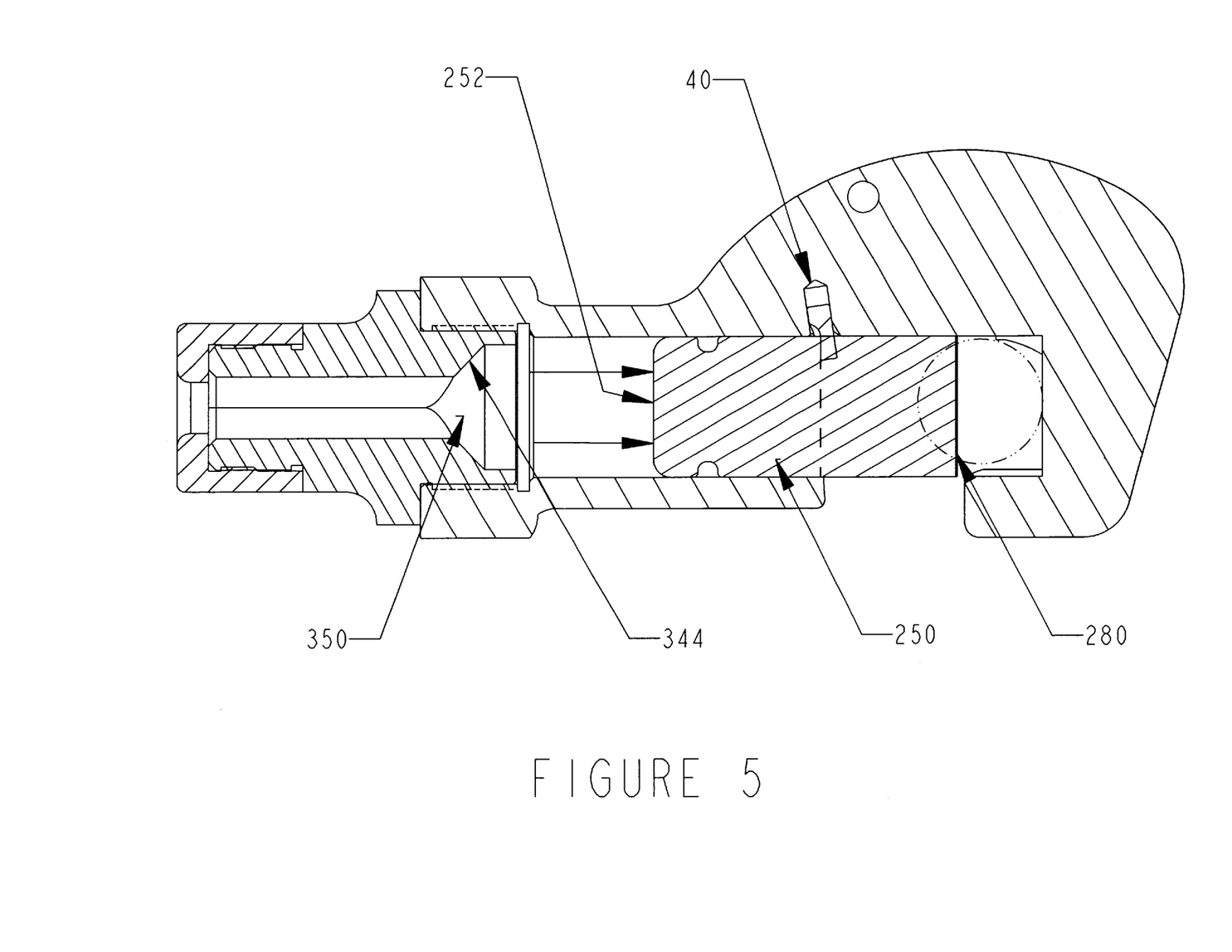
FIG. 5 is a cross-sectional view showing the cable cutter cutting a cable.

FIG. 4 shows cable cutter in the first position (before initiation) and FIG. 5 shows cutter 100 in the second position, cutter 250 cutting the workpiece such as a cable. The cable (not shown) is located in block receptacle 280. During movement in the direction of the arrow C, cutter 250 cuts the cable. A protruded portion of stopper 40 is cut off when cutter 250 starts to move toward the cable. Cone space 350 is provided within coupler 300 and between cone shaped-surface 344 of coupler 300 and cutter base 252 of cutter 250.

Figure 6A:
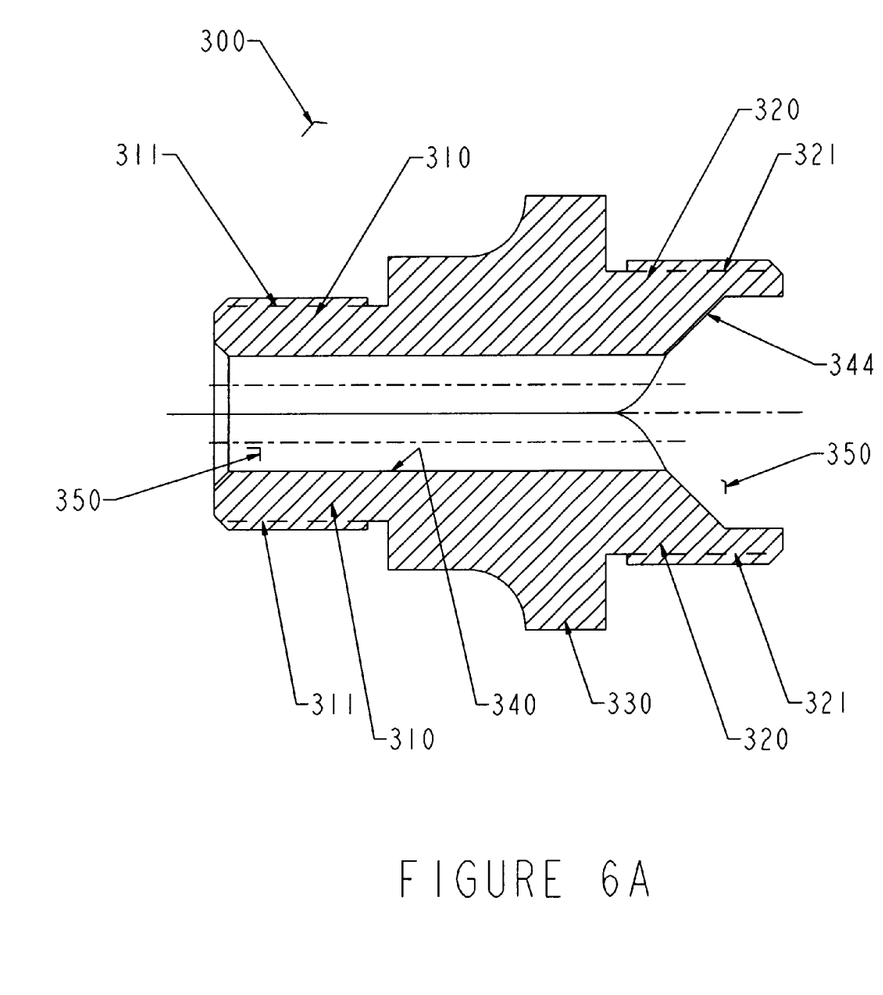
FIG. 6A is a longitudinal cross-sectional view of a coupler of the cable cutter.
Figure 6B:
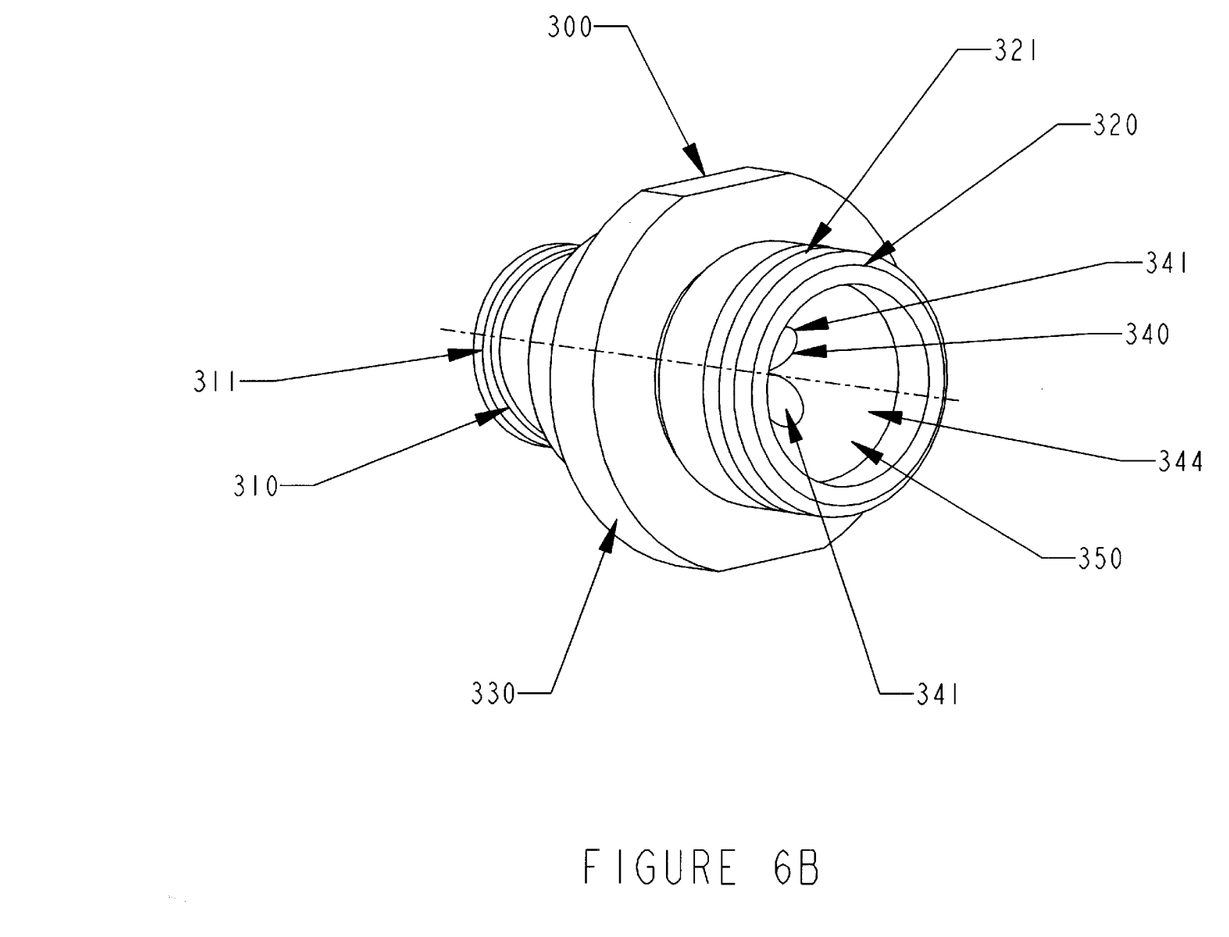
FIGS. 6B and 6C are a perspective view and a front view of the coupler.
Figure 6C:
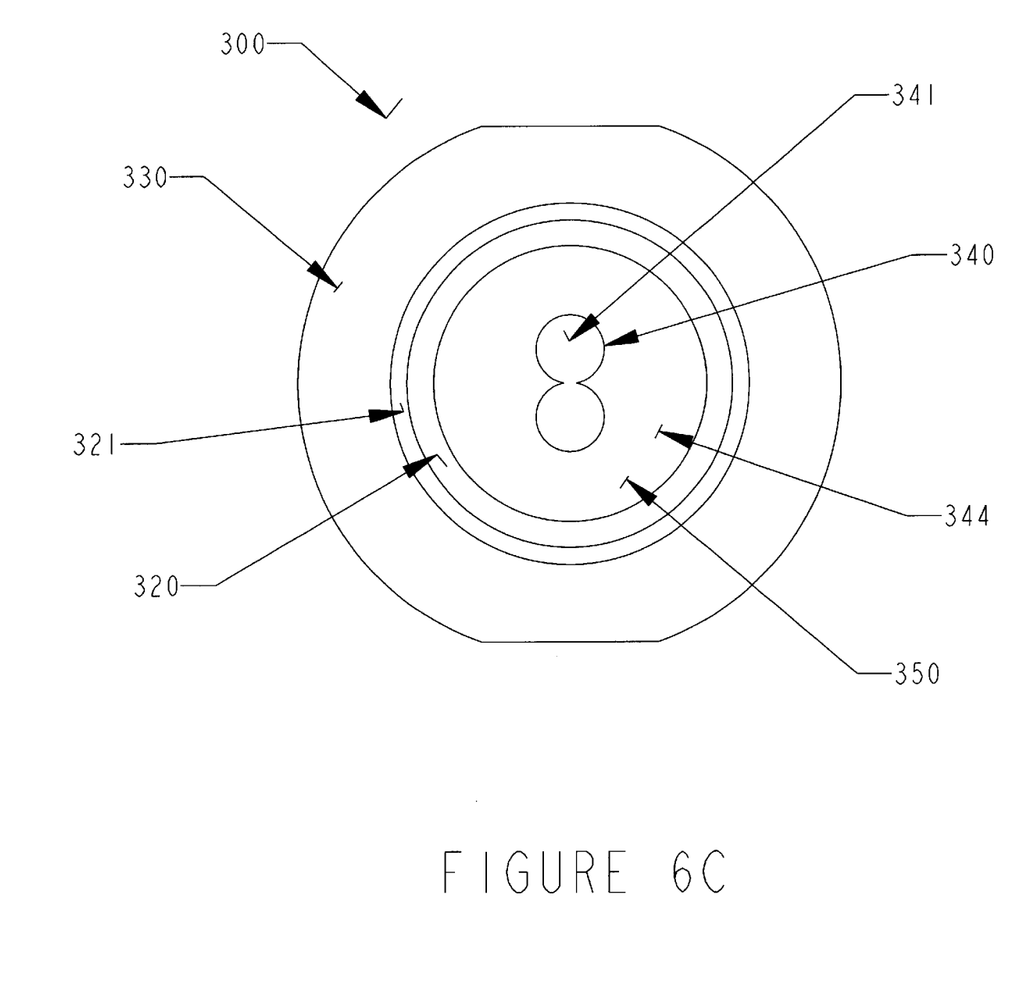

FIGS. 6A through 6C show coupler 300 in detail. Coupler 300 is formed in a single body and includes one end having head coupler 320 coupled to main body 200 and the other end having cap coupler 310 coupled to cap 400 (not depicted). Passageway 340 includes a plurality of detonator receptacles 341, and cone-shaped surface 344 is extended from detonator receptacles 341 to a cylindrical inner surface of head coupler 320 of coupler 300. The cone, shaped surface 344 is preferably at approximately a 45 degree angle from passageway 340.

Figure 7A:
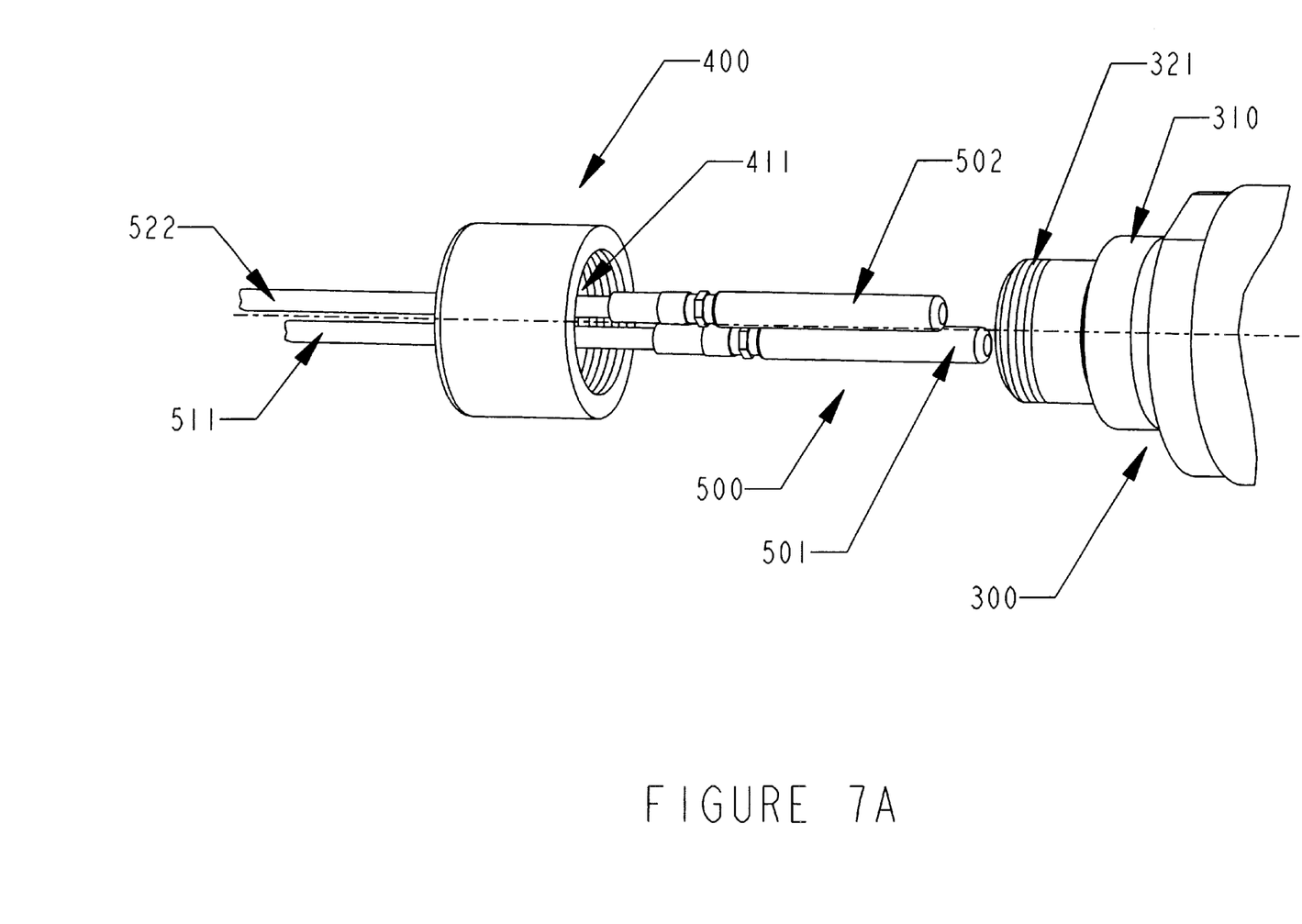
FIG. 7A is an exploded view of the cap and the coupler of the cable cutter of FIG. 1.
Figure 7B:
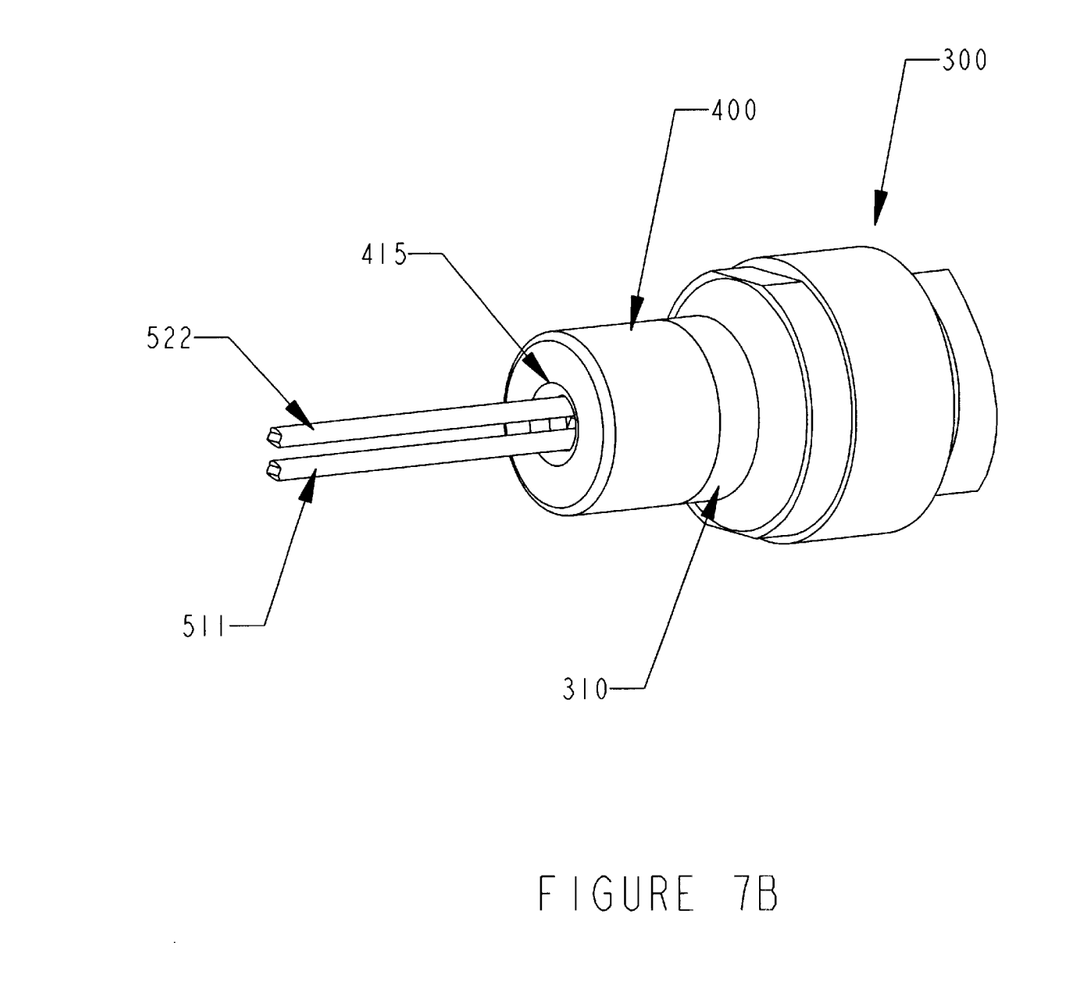
FIGS. 7B and 8 are a perspective view and a cross-sectional view of the cap.
Figure 8:
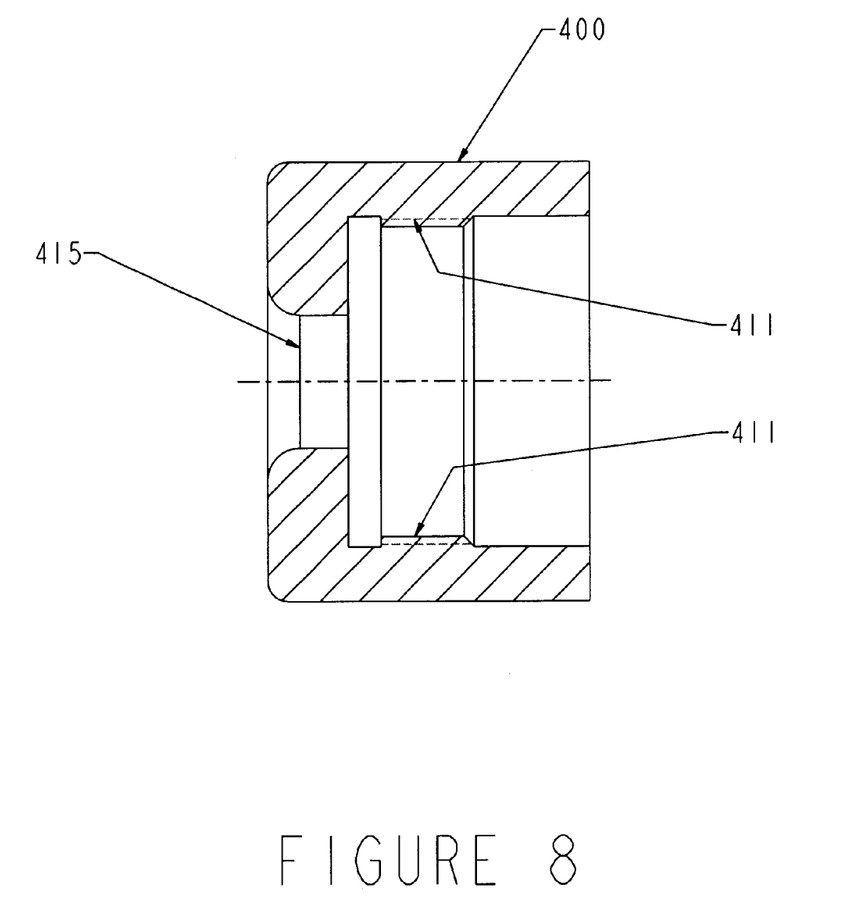

FIGS. 7A, 7B, and 8 show cap 400 coupled to coupler 300. Detonator assemblies 500 are inserted into cap 400 through blasting hole 415 and into coupler 300. And then, coupler 300 is coupled into main body 200 (not depicted). The cap 400, detonator assembly 500, and coupler 300 are easily dissembled from and assembled into main body 200.

Figure 9:
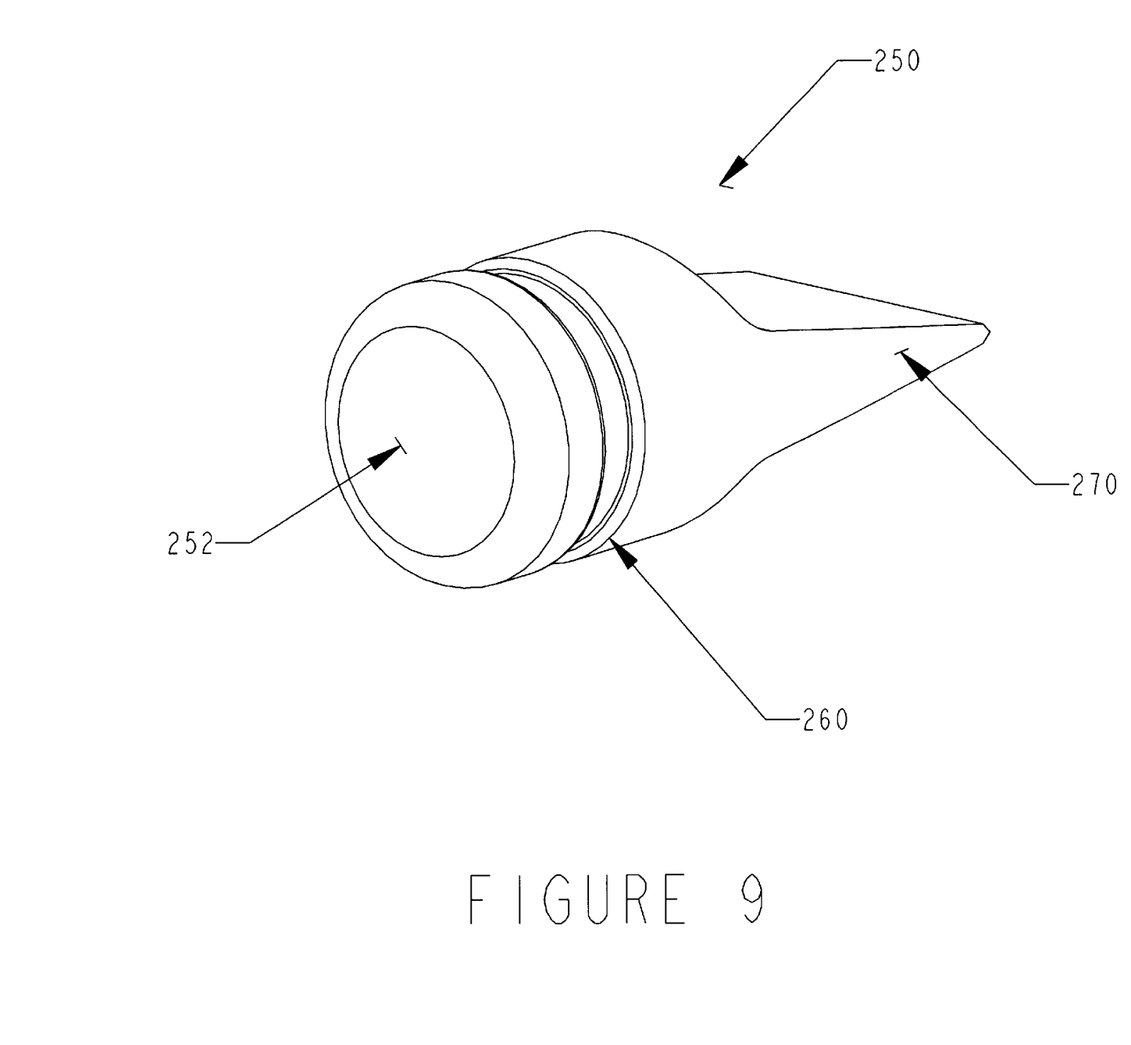
FIG. 9 is a perspective view of a cutter.
Figure 10:
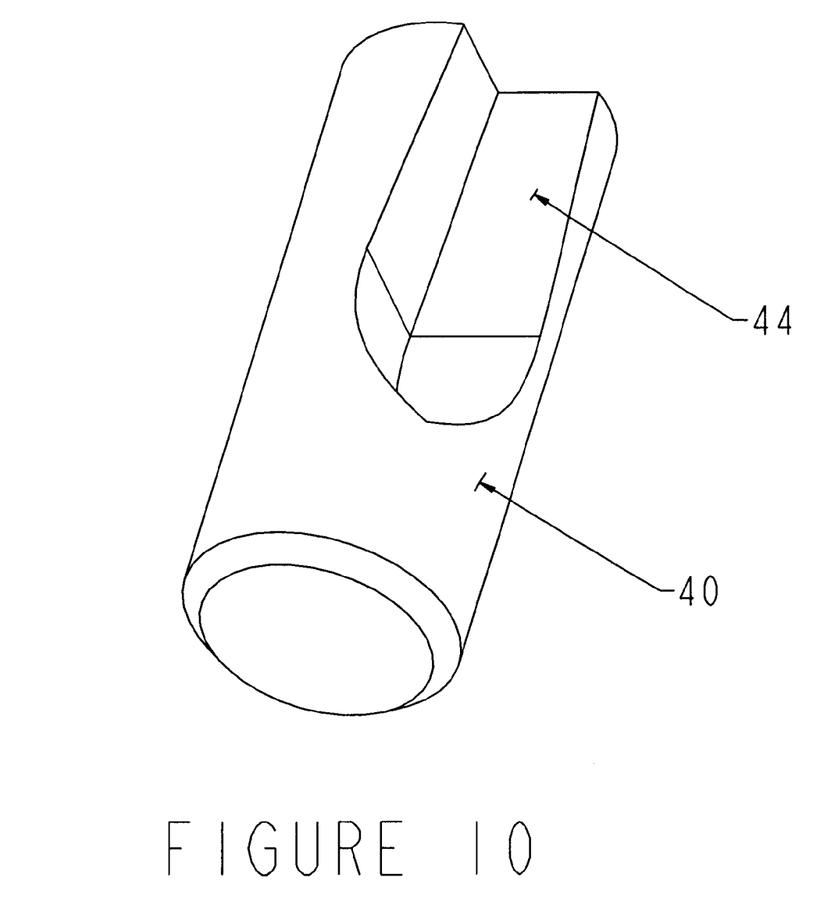
FIG. 10 is a perspective side view of a stopper.
Figure 11:
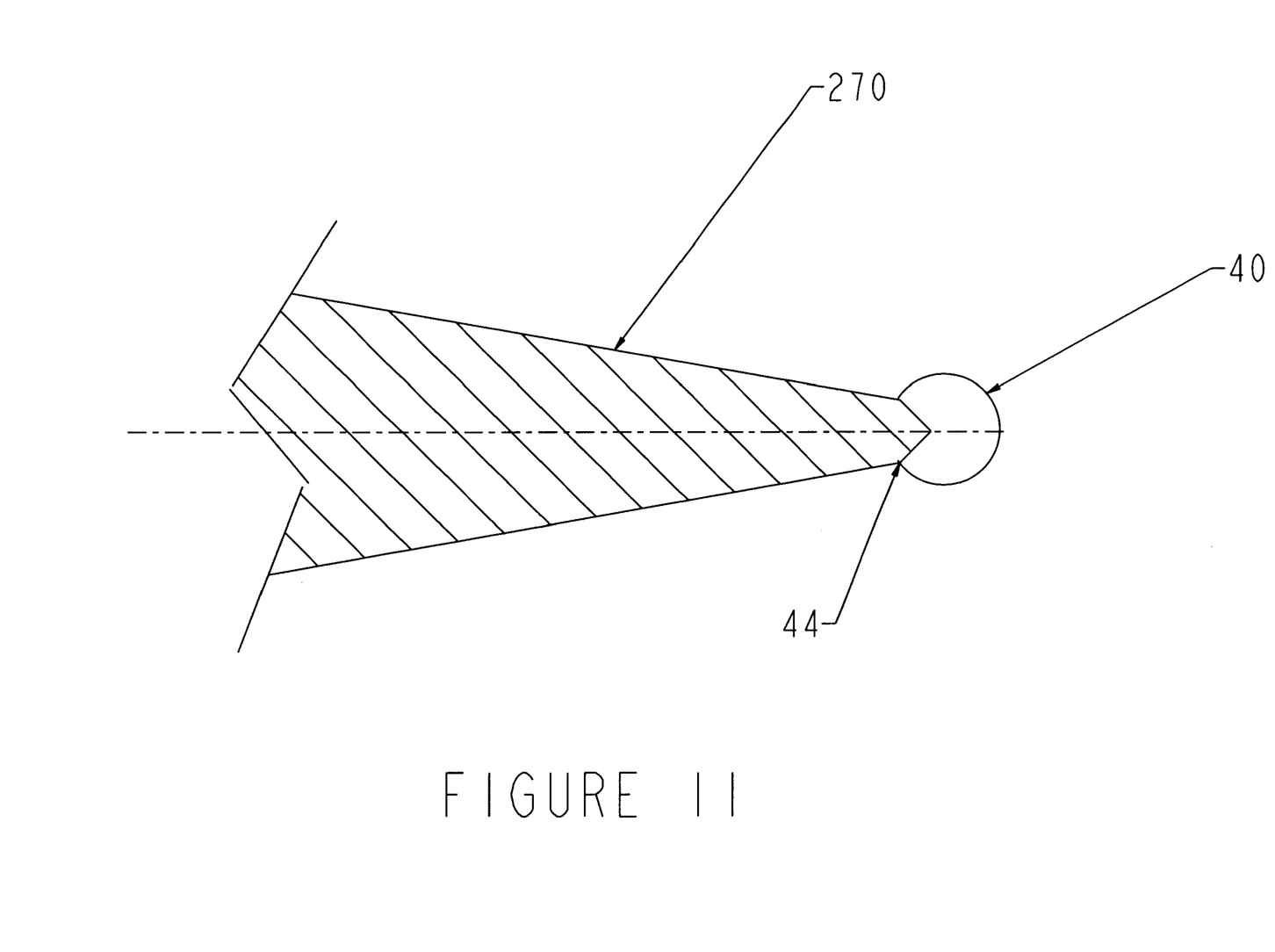
FIG. 11 is a partial cross-sectional view of FIG. 3.

Cutter 250 is shown in FIG. 9, and stopper 40 is shown in FIGS. 10A and 10B. A stopper groove 44 is formed on an upper portion of stopper 40 to accommodate the insertion of the blade 270. As shown in FIG. 11, blade 270 of cutter 250 is inserted into stopper groove 44 of stopper 40, and the blade is stopped by stopper 40. When the cutter 250 starts to move by the force of the shock waves, the blade 270 cuts off the upper portion of stopper 40 and moves toward the workpiece.

While this invention has been described in connection with what is presently considered to be the most practical and the disclosed embodiments, it is to be understood that the invention is not limited to the disclosed embodiments, but, on the contrary, is intended to cover various modifications and equivalent arrangements included within the sprit and the scope of the claims.

What is claimed is:

1. A cutting device, comprising:
   a main body, with first and second ends, having a workpiece holder formed on said first end of said main body;
   a bore having enter and exit ends formed inside of said main body wherein said first end faces said workpiece holder;
   a cutter having a blade and a base disposed within said bore, said blade proximate to said exit end and said base proximate to said enter end;
   a coupler having a passageway formed inside of said coupler and having front and back ends, said front end of said coupler connected to said second end of said main body wherein said bore and said passageway align;
   forward and rear portions of said passageway, said forward portion proximate to said front end of said coupler having a diameter wherein said diameter enlarges in approximately a conical shape;
   a cap coupled to said back end of said coupler, having a hole formed on said cap;
   an explosive material within said passageway; and,
   means to detonate said explosive material inserted through said hole of said cap wherein detonation creates a shock wave directed by said conical shape to push said base of said cutter so that said blade of said cutter passes through said workpiece holder.

2. The cutting device of claim 1, wherein said conical shape comprises an angle of approximately 45 degrees from the rear portion of said passageway.

3. The cutting device of claim 2, wherein said explosive material is selected from the group including RDX (Cyclotrimethylenetrinitramine) or HMX (Cyclotetramethylenetetranitramine).

4. The cutting device of claim 3, wherein said explosive material and said detonating means comprises a non-electric M7 detonator.

5. The cutting device of claim 4, wherein said explosive material and said detonating means comprises dual non-electric M7 detonators.

6. The cutting device of claim 5, further comprising a first thread formed on said front end of said coupler and a second thread formed on said second end of said main body wherein said first thread couples removeably to said second thread.

7. The cutting device of claim 6, further comprising a back thread formed on said back end of said coupler and a front thread formed on said cap wherein said back thread couples removeably to said front thread.

8. The cutting device of claim 7, wherein said cutter further comprises an o-ring groove formed proximate to the base of said cutter and an o-ring placed within said o-ring groove to seal said cutter within said bore.

9. The cutting device of claim 8, further comprising a stopper, partially extended through said bore wherein said stopper holds said cutter within said bore until said shock wave pushes said cutter.

10. The cutting device of claim 9, wherein said stopper comprises a pin.

11. The cutting device of claim 10, further comprising a safety assembly having an armed and a disarmed position wherein said cutting device cannot operate unless said safety assembly comprises said disarmed position.

12. The cutting device of claim 11, wherein said safety assembly comprises:
   a hole formed in said main body;
   at least one pin having ends inserted through said hole wherein said ends extend beyond said main body;
   a spring having a coil wherein said coil moveably connects to said ends and wherein said spring comprises a safety position and a release position;
   a safety block, connected to said spring, and removeably inserted within said workpiece holder, wherein said spring holds said safety block within said workpiece holder when in said safety position and releases said safety block when said spring comprises a release position.

* * * * *